United States Patent
Lin et al.

(10) Patent No.: US 10,644,863 B2
(45) Date of Patent: May 5, 2020

(54) COMMUNICATION DEVICE AND ECHO CANCELLATION METHOD THEREOF

(71) Applicant: ALi Corporation, Hsinchu (TW)

(72) Inventors: Wei-Jian Lin, Hsinchu (TW); Zhi-Ming Zeng, Shanghai (CN)

(73) Assignee: ALi Corporation, Hsinchu (TW)

( * ) Notice: Subject to any disclaimer, the term of this patent is extended or adjusted under 35 U.S.C. 154(b) by 137 days.

(21) Appl. No.: 16/034,165

(22) Filed: Jul. 12, 2018

(65) Prior Publication Data

US 2019/0245673 A1   Aug. 8, 2019

(30) Foreign Application Priority Data

Feb. 6, 2018   (CN) .......................... 2018 1 0118262

(51) Int. Cl.
*H04L 5/14* (2006.01)
*H04B 3/23* (2006.01)

(52) U.S. Cl.
CPC ........... *H04L 5/1461* (2013.01); *H04B 3/235* (2013.01)

(58) Field of Classification Search
None
See application file for complete search history.

(56) References Cited

U.S. PATENT DOCUMENTS

| | | | | |
|---|---|---|---|---|
| 6,980,644 | B1 * | 12/2005 | Sallaway | H04M 9/082 379/391 |
| 7,139,342 | B1 * | 11/2006 | Phanse | H04B 3/23 375/350 |
| 7,756,228 | B1 * | 7/2010 | Manickam | H04L 25/03254 375/285 |
| 8,670,555 | B2 * | 3/2014 | Huang | H04B 3/238 379/406.1 |
| 2001/0031012 | A1 * | 10/2001 | Josefsson | H04B 3/23 375/259 |
| 2005/0099966 | A1 * | 5/2005 | Huang | H04B 3/23 370/286 |
| 2008/0151787 | A1 * | 6/2008 | Lin | H04B 3/03 370/276 |
| 2010/0208577 | A1 | 8/2010 | Huang et al. | |
| 2012/0170735 | A1 * | 7/2012 | Huang | H04B 3/238 379/406.1 |

* cited by examiner

*Primary Examiner* — Otis L Thompson, Jr.
(74) *Attorney, Agent, or Firm* — J.C. Patents

(57) ABSTRACT

A communication device and an echo cancellation method are provided. A digital echo canceller is coupled to a transmitting circuit and a receiving circuit to generate an echo energy indicator according to a digital output signal and a digital input signal. A transceiving front-end circuit receives the analog output signal and generates a hybrid interface signal. A hybrid fine-tune circuit generates a first and a second capacitance calibration signals according to the echo energy indicator. An analog echo cancellation circuit receives the first and second capacitance calibration signals, and includes a first and a second variable capacitors controlled by the first capacitance calibration signal and a third and a fourth variable capacitors controlled by the second capacitance calibration signal. The analog echo cancellation circuit receives the analog output signal and the hybrid interface signal, and generates the analog input signal according to the first and second capacitance calibration signals.

11 Claims, 5 Drawing Sheets

COMMUNICATION DEVICE AND ECHO CANCELLATION METHOD THEREOF

CROSS-REFERENCE TO RELATED APPLICATION

This application claims the priority benefit of China application serial no. 201810118262.6, filed on Feb. 6, 2018. The entirety of the above-mentioned patent application is hereby incorporated by reference herein and made a part of this specification.

BACKGROUND OF THE INVENTION

Field of the Invention

The invention relates to an echo cancellation method, and particularly relates to a communication device with full-duplex data transmission and an echo cancellation method thereof.

Description of Related Art

Along with development of technology, networks become essential parts for exchanging information. In different network configurations, since the Ethernet has features of easy acquisition, convenient erection and fast transmission speed, etc., related products of the Ethernet are quickly developed, and a transmission rate thereof is also increased from 10 Mbps to 100 Mbps or even 1 Gbps. For example, an IEEE 802.3 standard defines a Gigabit Ethernet with a high transmission rate. In these new generation Ethernet standards, research and development of high speed Ethernet physical layer circuits and components are undoubtedly a key part.

An Ethernet communication device may use four pairs of twisted-pair wires to implement full-duplex data transmission, and one transmission port may include four transmission channels. Due to the full-duplex data transmission, a signal received by each of the transmission channels (i.e. one pair of twisted-pair wire) is generally influenced by an echo noise. In detail, FIG. 1 is a schematic diagram of a conventional full-duplex digital transceiver. In FIG. 1, one transmission channel (i.e. one pair of twisted-pair wire) is taken as an example for description. Referring to FIG. 1, two ends of a transmission twisted-pair wire 22 are connected to a transceiver 18 and a transceiver 20. Taking the transceiver 18 located at the left side as an example, the transceiver 18 includes a transmitter 12, a receiver 14 and a hybrid module 16.

Based on the aforementioned description, the transmitter 12 and the receiver 14 are both connected to the hybrid module 16, and the transceiver 18 may simultaneously send a signal and receive a signal. When the transmitter 12 sends a transmitting signal (a TX signal) to the transceiver 20, a near-end echo signal E2 and a far-end echo signal E1 are liable to be produced due to impedance mismatch between the transmission twisted-pair line 22 and the transceiver 18 or other reasons. When the near-end echo signal E2 and the far-end echo signal E1 are transmitted back to the transceiver 18, a noise of interference is produced, which influences a receiving signal 26 (a RX signal) received by the receiver 14. Therefore, how to perform effective and high-performance echo cancellation to the full-duplex data transmission framework becomes an important issue concerned by related technicians of the field.

SUMMARY OF THE INVENTION

The invention is directed to a communication device and an echo cancellation method thereof, which are adapted to effectively resolve a problem of echo interference with uncomplicated circuit configuration.

An embodiment of the invention provides a communication device capable of implementing full-duplex data transmission and including a transmitting circuit, a receiving circuit, a digital echo canceller, a transceiving front-end circuit, a hybrid fine-tune circuit and an analog echo cancellation circuit. The transmitting circuit receives a digital output signal to generate an analog output signal. The receiving circuit receives an analog input signal to generate a digital input signal. The digital echo canceller is coupled to the transmitting circuit and the receiving circuit, and generates an echo energy indicator according to the digital output signal and the digital input signal. The transceiving front-end circuit is coupled to the transmitting circuit, and receives the analog output signal and generates a hybrid interface signal. The hybrid fine-tune circuit is coupled to the digital echo canceller, and generates a first capacitance calibration signal and a second capacitance calibration signal according to the echo energy indicator. The analog echo cancellation circuit receives the first capacitance calibration signal and the second capacitance calibration signal, and includes a first variable capacitor and a second variable capacitor controlled by the first capacitance calibration signal and a third variable capacitor and a fourth variable capacitor controlled by the second capacitance calibration signal. The analog echo cancellation circuit receives the analog output signal and the hybrid interface signal, and generates the analog input signal according to the first capacitance calibration signal and the second capacitance calibration signal.

According to another aspect, the invention provides an echo cancellation method, which is adapted to a communication device capable of implementing full-duplex data transmission. The communication device includes a first variable capacitor, a second variable capacitor, a third variable capacitor and a fourth variable capacitor, and the method includes following steps. A digital output signal is converted into an analog output signal and the analog output signal is outputted by a transmitting circuit. An analog input signal is received, and the analog input signal is converted into a digital input signal for outputting by a receiving circuit. Digital echo cancellation is performed according to the digital output signal and the digital input signal to generate an echo energy indicator. The first variable capacitor, the second variable capacitor, the third variable capacitor and the fourth variable capacitor are adjusted according to a first capacitance calibration signal and a second capacitance calibration signal, so as to determine a first optimal value of the first capacitance calibration signal and a second optimal value of the second capacitance calibration signal according to the echo energy indicator. The first capacitance calibration signal and the second capacitance calibration signal are locked and output according to the first optimal value and the second optimal value.

Based the above description, in an embodiment of the invention, the digital echo canceller estimates energy of an echo signal, and the hybrid fine-tune circuit searches a set of optimal capacitance values according to an energy magnitude of the echo signal, so as to adjust the variable capacitor in the analog echo cancellation circuit to have an optimal capacitance value, which is able to minimize echo interference. The communication device of the invention is adapted to quickly search a capacitor parameter used for reducing the echo interference, and accordingly adjust the variable capacitor of the transceiving front-end circuit, so as to effectively reduce the interference of the echo signal.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
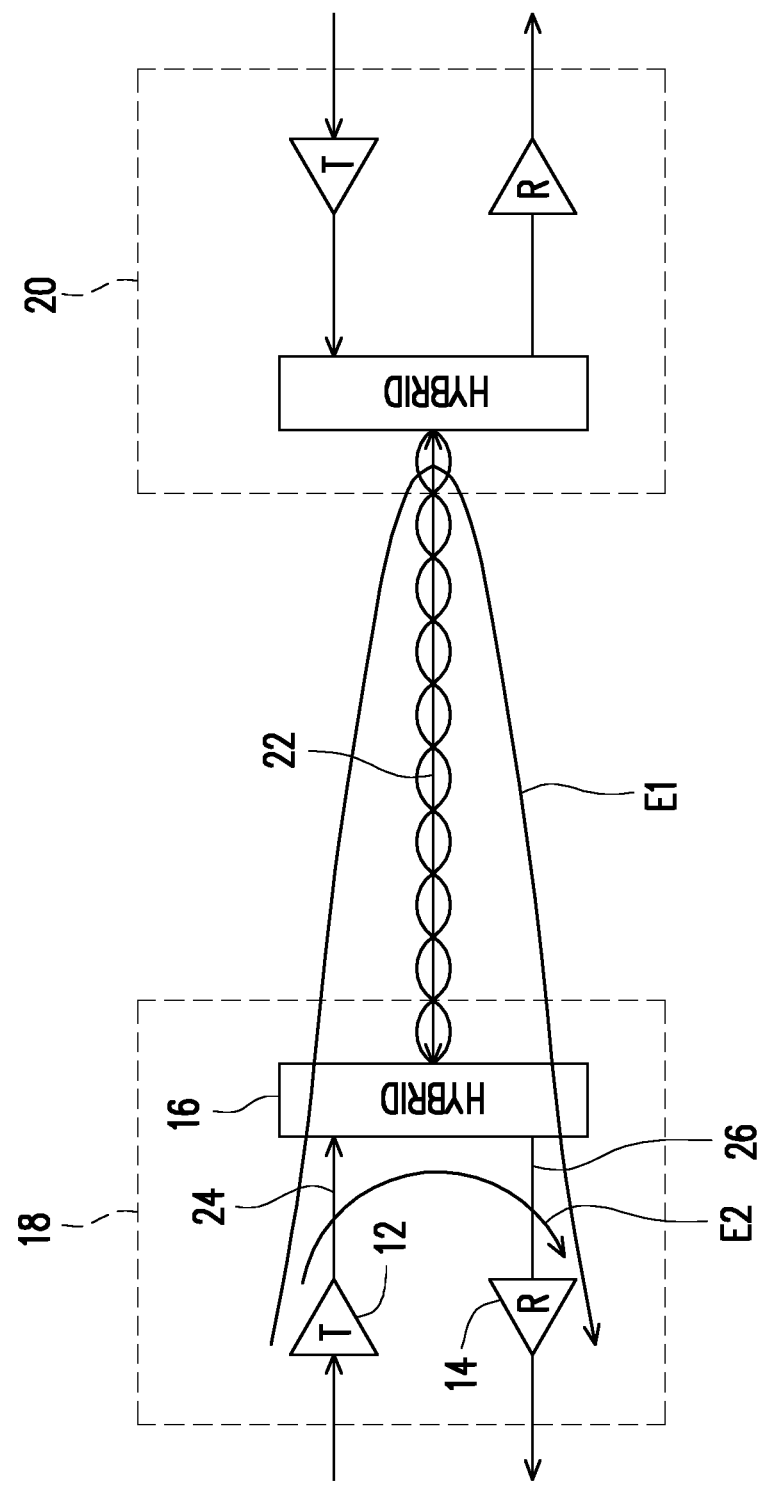
FIG. 1 is a schematic diagram of a conventional full-duplex digital transceiver.

Reference will now be made in detail to the present preferred embodiments of the invention, examples of which are illustrated in the accompanying drawings. Wherever possible, the same reference numbers are used in the drawings and the description to refer to the same or like parts.

Figure 2:
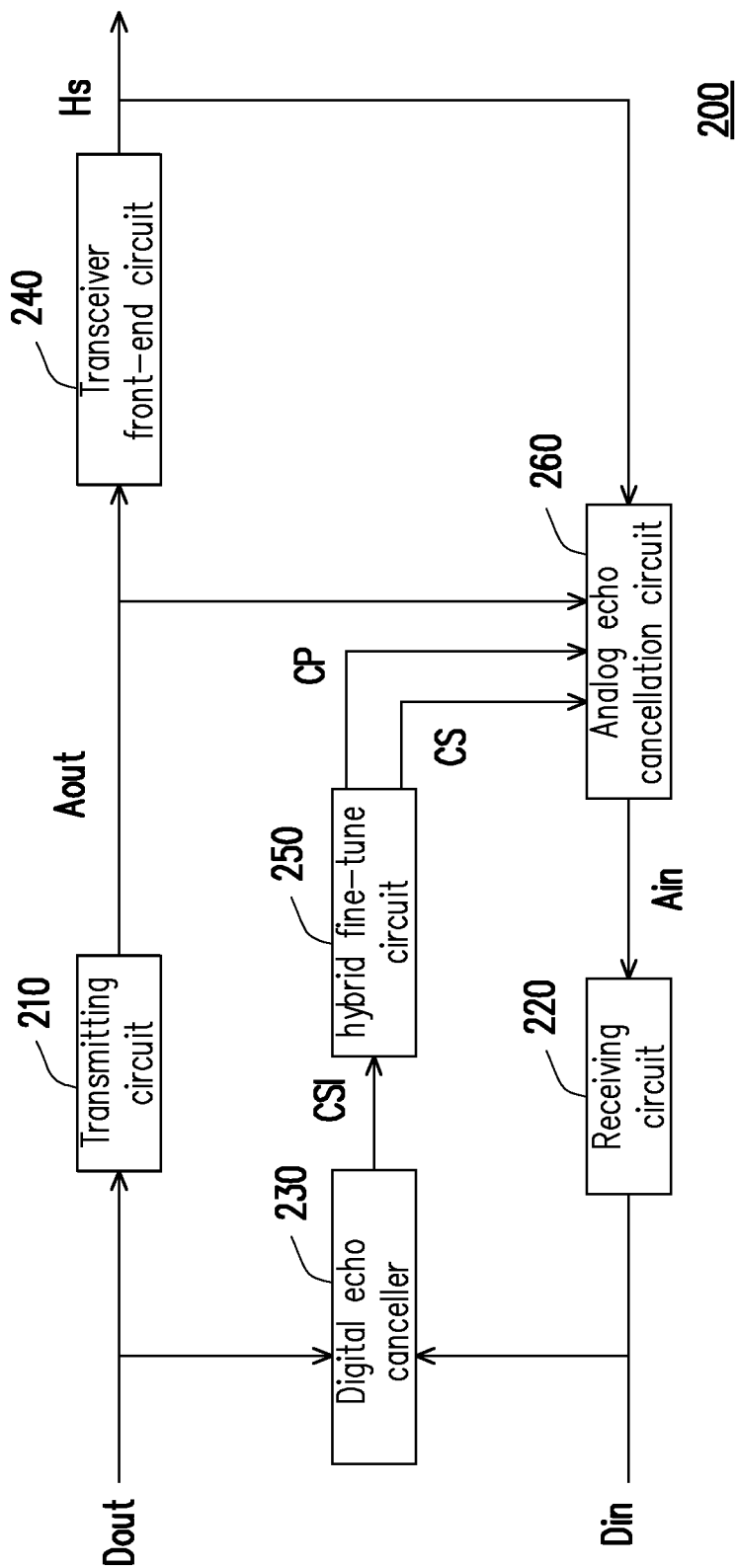
FIG. 2 is a schematic diagram of a communication device according to an embodiment of the invention.

FIG. 2 is a schematic diagram of a communication device according to an embodiment of the invention. Referring to FIG. 2, the communication device 200 adapted to implement full-duplex data transmission includes a transmitting circuit 210, a receiving circuit 220, a digital echo canceller 230, a transceiving front-end circuit 240, a hybrid fine-tune circuit 250 and an analog echo cancellation circuit 260. In the present embodiment, the communication device 200, for example, implements the full-duplex data transmission with a remote device via a twisted pair wire based on an Ethernet standard, and the Ethernet standard is, for example, a Gigabit Ethernet standard, though the invention is not limited thereto.

The transmitting circuit 210 receives a digital output signal Dout to generate an analog output signal Aout, and the receiving circuit 220 receives an analog input signal Ain to generate a digital input signal Din. In an embodiment, it is assumed that the communication device 200 supports the Gigabit Ethernet standard, and the above digital output signal Dout is, for example, a specific calibration sequence in a training procedure, though the invention is not limited thereto. Generally, the communication device 200 supporting the Gigabit Ethernet standard may perform the training procedure at an early state of establishing a link, so as to determine a master-slave relationship and some transmission parameters to establish the link. Before echo cancellation is performed, when the transmitting circuit 210 outputs the analog output signal Aout, a far-end/near-end echo component may obviously interfere the analog input signal Ain received by the receiving circuit 220. In an embodiment, the communication device 200 may send a specific calibration sequence through the transmitting circuit 210 during the training procedure. Correspondingly, an echo caused by the above specific calibration sequence is received by the receiving circuit 220. Therefore, through detecting the echo caused by the specific calibration sequence, the analog echo cancellation circuit 260 may determine a related parameter setting used for echo cancellation during the training procedure.

The digital echo canceller 230 is coupled to the transmitting circuit 210 and the receiving circuit 220, and generates an echo energy indicator CSI according to the digital output signal Dout and the digital input signal Din. Generally, every transceiver device of the Gigabit Ethernet has a digital echo canceller. In the present embodiment, the digital echo canceller 230 may be an adaptive filter, which may estimate the echo component according to the digital output signal Dout and the digital input signal Din, and accordingly output the echo energy indicator CSI. The echo energy indicator CSI may be filter coefficients corresponding to each tap of the adaptive filter.

The transceiving front-end circuit 240 is coupled to the transmitting circuit 210, and receives the analog output signal Aout and generates a hybrid interface signal Hs. The hybrid interface signal Hs may be transmitted to the far-end device through the twisted pair wire via coupling of a transformer. The hybrid fine-tune circuit 250 is coupled to the digital echo canceller 230, and generates a first capacitance calibration signal CP and a second capacitance calibration signal CS according to the echo energy indicator CSI. The analog echo cancellation circuit 260 receives the first capacitance calibration signal CP and the second capacitance calibration signal CS, wherein the analog echo cancellation circuit 260 includes a first variable capacitor C1 (shown in FIG. 3) and a second variable capacitor C2 (shown in FIG. 3) controlled by the first capacitance calibration signal CP, and in addition, the analog echo cancellation circuit 260 further includes a third variable capacitor C3 (shown in FIG. 3) and a fourth variable capacitor C4 (shown in FIG. 3) controlled by the second capacitance calibration signal CS. The first capacitance calibration signal CP and the second capacitance calibration signal CS are used for determining capacitance setting states of the variable capacitors in the analog echo cancellation circuit 260.

Therefore, the analog echo cancellation circuit 260 receives the analog output signal Aout and the hybrid interface signal Hs, and generates the analog input signal Ain based on the first capacitance calibration signal CP and the second capacitance calibration signal CS. In other words, the receiving circuit 220 receives the analog input signal Ain output by the analog echo cancellation circuit 260 based on the first capacitance calibration signal CP and the second capacitance calibration signal CS, and outputs the digital input signal Din depending on the first capacitance calibration signal CP and the second capacitance calibration signal CS. In this way, by detecting the echo component carried by the digital input signal Din under different capacitance setting states through the digital echo canceller 230, the hybrid fine-tune circuit 250 may obtain an optimal capacitance parameter configuration that minimize the echo component energy, and respectively lock the first capacitance calibration signal CP and the second capacitance calibration signal CS to optimal capacitance values, so as to effectively reduce the echo interference.

Figure 3:
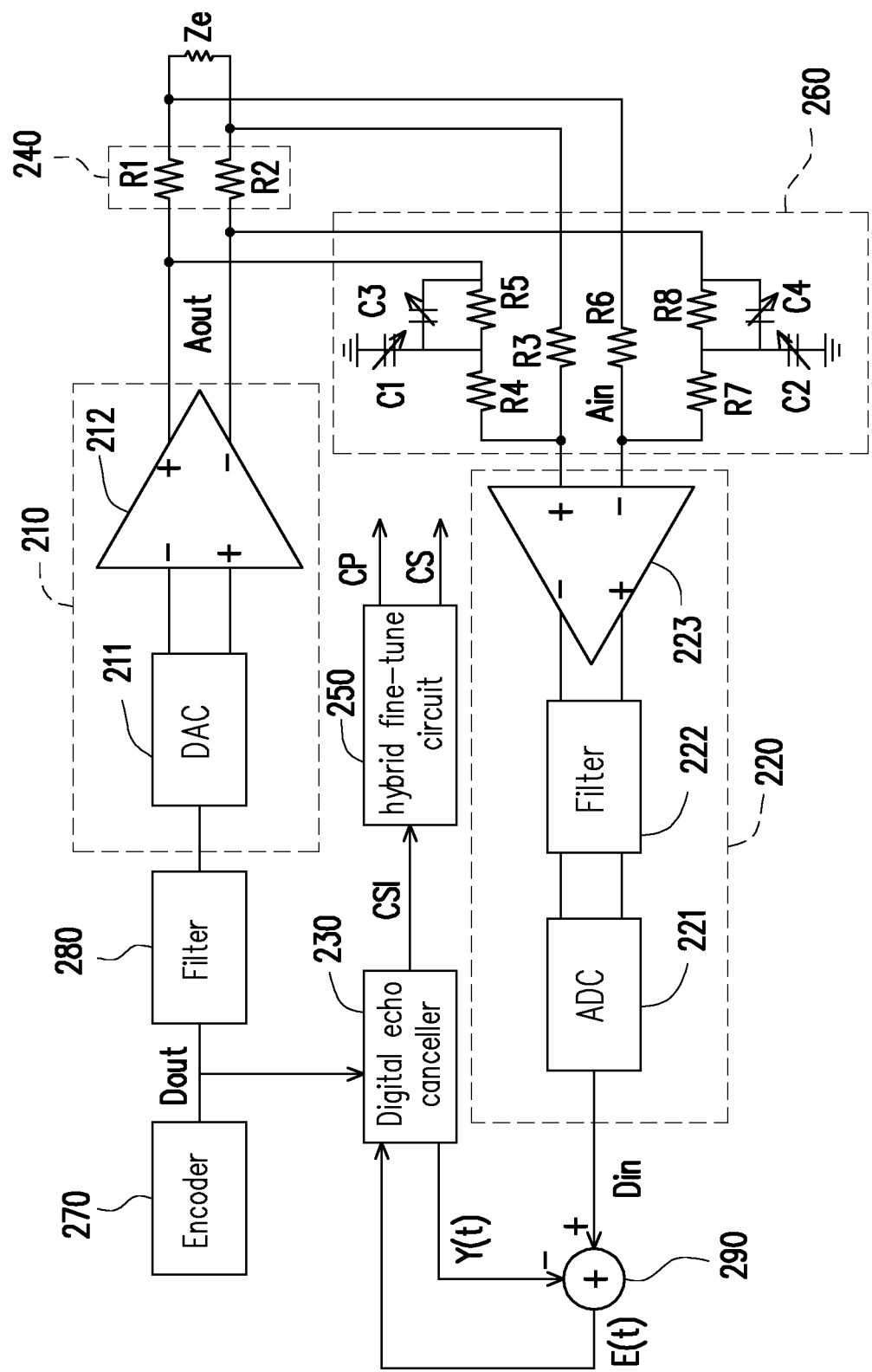
FIG. 3 is a schematic diagram of a communication device according to an embodiment of the invention.

FIG. 3 is a schematic diagram of a communication device according to an embodiment of the invention. Referring to FIG. 3, in an embodiment, the communication device used for implementing the full-duplex data transmission includes the transmitting circuit 210, the receiving circuit 220, the digital echo canceller 230, an adder-subtracter 290, the transceiving front-end circuit 240, the hybrid fine-tune circuit 250 and the analog echo cancellation circuit 260.

The transmitting circuit 210 includes a digital-to-analog converter (DAC) 211 and an amplifier 212. The DAC 211 converts the digital output signal Dout into an analog signal in a differential form, and the amplifier 212 amplifies the analog signal generated by the DAC 211 to generate the analog output signal Aout in the differential form. A first output terminal of the transmitting circuit 210 (for example, a positive output terminal of the amplifier 212) and a second output terminal of the transmitting circuit 210 (for example, a negative output terminal of the amplifier 212) output the analog output signal Aout in the differential form to the transceiving front-end circuit 240.

The receiving circuit 220 includes an analog-to-digital converter (ADC) 221, a filter 222 and an amplifier 223. The amplifier 223 receives the analog input signal Ain in the differential form, and outputs the amplified analog signal to the filter 222. The filter 222 is, for example, a low pass filter, and outputs the analog signal subjected to the low-pass filtering to the ADC 221. The ADC 221 may convert the analog signal of in differential form into the digital input signal Din after sampling.

The transceiving front-end circuit 240 includes a first impedance unit R1 and a second impedance unit R2. The first impedance unit R1 is coupled between the first output terminal of the transmitting circuit 210 and a second input terminal of the receiving circuit 220 (for example, a negative input terminal of the amplifier 223), and the second impedance unit R2 is coupled between the second output terminal of the transmitting circuit 210 and a first input terminal of the receiving circuit 220 (for example, a positive input terminal of the amplifier 223). In the present embodiment, the first impedance unit R1 and the second impedance unit R2 are, for example, respectively a resistor, though the invention is not limited thereto. The transceiving front-end circuit 240 is coupled to external impedance Ze. In the present embodiment, for simplicity's sake, the external impedance Ze is equivalent to all of external impedances coupled to the communication device 300.

It should be noted that the analog echo cancellation circuit 260 includes a first variable capacitor C1, a second variable capacitor C2, a third variable capacitor C3 and a fourth variable capacitor C4. Moreover, the analog echo cancellation circuit 260 further includes resistors R3-R8. As shown in FIG. 3, a first terminal of the first variable capacitor C1 is coupled to a reference voltage (for example, a ground voltage). A second terminal of the first variable capacitor C1 is coupled to the first input terminal of the receiving circuit 220 through the resistor R4. A first terminal of the third variable capacitor C3 is coupled to the second terminal of the first variable capacitor C1. In addition, the third variable capacitor C3 and the resistor R5 are coupled in parallel, and the first terminal of the third variable capacitor C3 is also coupled to the first input terminal of the receiving circuit 220 through the resistor R4. A second terminal of the third variable capacitor C3 is coupled to the first output terminal of the transmitting circuit 210. One end of the resistor R3 is coupled to the first input terminal of the receiving circuit 220, and another end of the resistor R3 is coupled to the second output terminal of the transmitting circuit 210 through the second impedance unit R2.

A first terminal of the second variable capacitor C2 is coupled to a reference voltage (for example, the ground voltage). A second terminal of the second variable capacitor C2 is coupled to the second input terminal of the receiving circuit 220 through the resistor R7. A first terminal of the fourth variable capacitor C4 is coupled to the second terminal of the second variable capacitor C2. In other words, the first terminal of the fourth variable capacitor C4 is also coupled to the second input terminal of the receiving circuit 220 through the resistor R7. The fourth variable capacitor C4 and the resistor R8 are coupled in parallel, and a second terminal of the fourth variable capacitor C4 is coupled to the second output terminal of the transmitting circuit 210. One end of the resistor R6 is coupled to the second input terminal of the receiving circuit 220, and another end of the resistor R6 is coupled to the first output terminal of the transmitting circuit 210 through the first impedance unit R1.

It should be noted that the first variable capacitor C1 and the second variable capacitor C2 coupled to the reference voltage are controlled by the first capacitance calibration signal CP, and the third variable capacitor C3 and the fourth variable capacitor C4 are controlled by the second capacitance calibration signal CS.

The ADC 221 of the receiving circuit 220 may output the digital input signal Din to the adder-subtracter 290. The adder-subtracter 290 is coupled between the ADC 221 and the digital echo canceller 230 to eliminate residual echo in the digital input signal Din. A first input terminal of the adder-subtracter 290 receives the digital input signal Din, a second input terminal of the adder-subtracter 290 receives an estimated residual echo signal Y(t) which outputted by the digital echo canceller 230, and the adder-subtracter 290 subtracts the estimated residual echo signal Y(t) from the digital input signal Din to obtain a residual echo-eliminated digital input signal E(t) used for eliminate the residual echo.

The digital echo canceller 230 may update a filter coefficient of the adaptive filter according to the digital input signal E(t) used for eliminate the residual echo, and the digital echo canceller 230 may estimate energy of the residual echo and output the estimated residual echo signal Y(t). Moreover, the digital echo canceller 230 may calculate the echo energy indicator CSI according to the digital input signal E(t) used for eliminate the residual echo and the digital output signal Dout, where the echo energy indicator CSI is a filter coefficient corresponding to each tap of the adaptive filter. In an embodiment, the digital echo canceller 230, for example, includes a least mean square (LMS) adaptive filter, and the filter coefficient thereof may be produced through an iteration operation. The hybrid fine-tune circuit 250 may adjust capacitances of the first variable capacitor C1, the second variable capacitor C2, the third variable capacitor C3 and the fourth variable capacitor C4, so as to obtain the echo energy indicator CSI corresponding to different capacitance setting states.

Moreover, in an embodiment, the communication device 300 may further include an encoder 270 and a filter 280. The encoder 270 performs error control encoding, and is, for example, a Trellis-coded modulation (TCM) encoder, and the filter 280 may be a shaping filter. The filter 280 may perform shaping filtering to the digital output signal Dout, and output the shaped digital signal to the transmitting circuit 210. However, circuits besides the transmitting circuit 210, the receiving circuit 220, the digital echo canceller 230, the transceiving front-end circuit 240, the hybrid fine-tune circuit 250 and the analog echo cancellation circuit 260 may be designed according to an actual application requirement, which is not limited by the invention.

Figure 4:
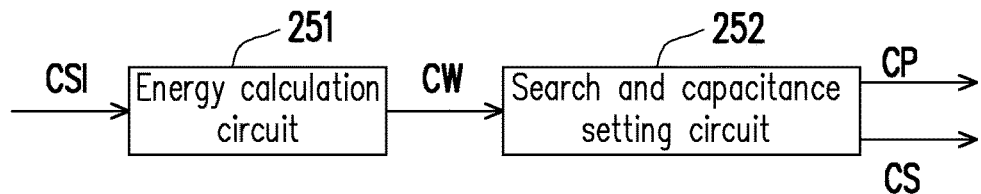
FIG. 4 is a schematic diagram of a hybrid fine-tune circuit according to an embodiment of the invention.

It should be noted that the capacitance setting state that makes an energy statistical value of the echo energy indicator CSI to be the minimum may serve as an optimal capacitance setting of the analog echo cancellation circuit 260. In detail, FIG. 4 is a schematic diagram of a hybrid fine-tune circuit according to an embodiment of the invention. Referring to FIG. 4, the hybrid fine-tune circuit 250 includes an energy calculation circuit 251 and a search and capacitance setting circuit 252. The energy calculation circuit 251 is coupled to the digital echo canceller 230 to receive the echo energy indicator CSI, and performs a statistical operation to the echo energy indicator CSI to obtain an energy statistical value CW. For example, the energy calculation circuit 251 may obtain absolute values of each of the filter coefficients in the echo energy indicator CSI and sum the absolute values to generate the energy statistical value CW, as shown in a following equation (1). Alternatively, the energy calculation circuit 251 may obtain squares of each of the filter coefficients in the echo energy indicator CSI and sum the squares to generate the energy statistical value CW, as shown in a following equation (2):

$$CW = \sum_{i=1}^{n} |coef(i)| \quad \text{equation (1)}$$

$$CW = \sum_{i=1}^{n} [coef(i)]^2 \quad \text{equation (2)}$$

Where, coef(i) represents the filter coefficients in an $n^{th}$ stage adaptive filter (or referred to as pulse response coefficients), and CW represents the energy statistic value.

The search and capacitance setting circuit 252 is coupled to the energy calculation circuit 251, and determines a first optimal value of the first capacitance calibration signal CP and a second optimal value of the second capacitance calibration signal CS according to the energy statistical value CW. Further, the search and capacitance setting circuit 252 may change the capacitances of the first variable capacitor C1 to the fourth variable capacitor C4 by adjusting the first capacitance calibration signal CP and the second capacitance calibration signal CS, such that the first variable capacitor C1 to the fourth variable capacitor C4 may be set to different capacitance setting states $S_i$.

For example, the capacitance of the first variable capacitor C1, the capacitance of the second variable capacitor C2, the capacitance of the third variable capacitor C3, and the capacitance of the fourth variable capacitor C4 may be respectively controlled by the 3-bits first capacitance calibration signal CP and the 3-bits second capacitance calibration signal CS. The first capacitance calibration signal CP and the second capacitance calibration signal CS may be applied to adjust the capacitance of the first variable capacitor C1, the capacitance of the second variable capacitor C2, the capacitance of the third variable capacitor C3, and the capacitance of the fourth variable capacitor C4 through different bit combinations such as "001", "010", "110", etc. Under such consumption, the capacitances of the first variable capacitor C1 to the fourth variable capacitor C4 have $2^3*2^3=64$ different capacitance setting states $S_i$. Alternatively, in another embodiment, the capacitance of the first variable capacitor C1, the capacitance of the second variable capacitor C2, the capacitance of the third variable capacitor C3, and the capacitance of the fourth variable capacitor C4 may be respectively controlled by the 4-bits first capacitance calibration signal CP and the second capacitance calibration signal CS. Under such consumption, the capacitances of the first variable capacitor C1 to the fourth variable capacitor C4 have $2^4*2^4=256$ different capacitance setting states $S_i$. The number of the capacitance setting states, the bit number of the first capacitance calibration signal CP and the bit number of the second capacitance calibration signal CS are not limited by the invention.

In case that the first variable capacitor C1 to the fourth variable capacitor C4 may be set to correspond to different capacitance setting states $S_i$ based on different capacitances of the first variable capacitor C1 to the fourth variable capacitor C4, the search and capacitance setting circuit 252 may obtain a plurality of energy statistical values $CW_i$ corresponding to the different capacitance setting states $S_i$ from the energy calculation circuit 251. In this way, based on a minimum energy statistical value $CW_{min}$ among the energy statistical values $CW_i$, the search and capacitance setting circuit 252 may obtain the first optimal value and the second optimal value corresponding to the minimum energy statistical value $CW_{min}$, and the hybrid fine-tune circuit 250 locks and outputs the first capacitance calibration signal CP according to the first optimal value and locks and outputs the second capacitance calibration signal CS according to the second optimal value.

In an embodiment of the invention, by fixing the first capacitance calibration signal CP and changing the second capacitance calibration signal CS, the search and capacitance setting circuit 252 may determine the second optimal value of the second capacitance calibration signal CS. Thereafter, by fixing the second capacitance calibration signal CS to the second optimal value and changing the first capacitance calibration signal CP, the search and capacitance setting circuit 252 may determine the first optimal value of the first capacitance calibration signal CP.

Taking the 4-bits capacitance calibration signal as an example, when the first capacitance calibration signal CP is fixed to a predetermined value, the search and capacitance setting circuit 252 may sequentially adjust the setting of the second capacitance calibration signal CS from [0000] to [1111], and sequentially obtain 16 corresponding energy statistical values $CW_0$-$CW_{15}$. The search and capacitance setting circuit 252 first compares the energy statistical value $CW_0$ corresponding to [0000] with the energy statistical value $CW_1$ corresponding to [0001] to determine a temporary minimum energy statistical value and record the same in a register. Then, the search and capacitance setting circuit 252 compares the temporary minimum energy statistical value in the register with the energy statistical value $CW_2$ corresponding to [0010]. When the temporary minimum energy statistical value in the register is greater than the energy statistical value $CW_2$ corresponding to [0010], the temporary minimum energy statistical value in the register is not changed. Comparatively, when the temporary minimum energy statistical value in the register is smaller than the energy statistical value $CW_2$ corresponding to [0010], the temporary minimum energy statistical value in the register is updated to the energy statistical value $CW_2$ corresponding to [0010]. The above steps are sequentially repeated until the second capacitance calibration signal CS is adjusted to [1111], the search and capacitance setting circuit 252 has completed comparing the 16 energy statistical values $CW_0$-$CW_{15}$, and the temporary minimum energy statistical value in the register is the second optimal value of the second capacitance calibration signal CS.

Then, the search and capacitance setting circuit 252 fixes the second capacitance calibration signal CS to the second optimal value, and sequentially adjusts the setting of the first capacitance calibration signal CP from [0000] to [1111], and sequentially obtains 16 corresponding energy statistical values $CW_{16}$-$CW_{31}$. Similarly, by sequentially comparing the temporary minimum energy statistical value in the register with the currently obtained energy statistical value, after the first capacitance calibration signal CP is adjusted to [1111], the search and capacitance setting circuit 252 may finally obtain the first optimal value of the first capacitance calibration signal CP from the register. Therefore, in the present embodiment, the optimal capacitance configuration used for eliminating the echo interference may be obtained through the efficient comparing method and a trimmed register.

Figure 5:
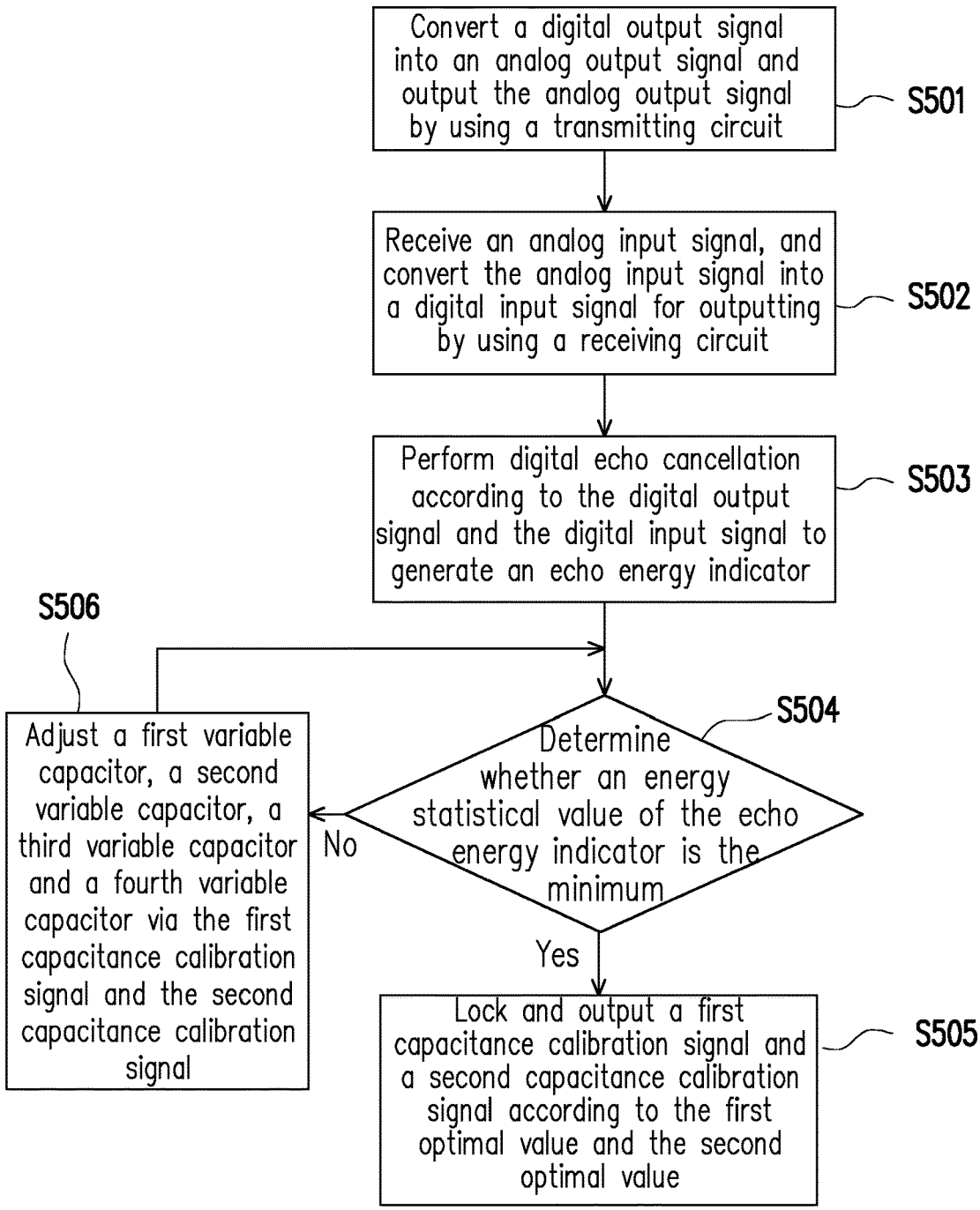
FIG. 5 is a flowchart illustrating an echo cancellation method according to an embodiment of the invention.

FIG. 5 is a flowchart illustrating an echo cancellation method according to an embodiment of the invention. Moreover, those skilled in the art may learn enough instructions and recommendations for related implementation details of the echo cancellation method and related device features of the present embodiment from descriptions of the embodiments of FIG. 1 to FIG. 4, and details thereof are not repeated.

In step S501, a digital output signal is converted into an analog output signal, and output the analog output signal by using a transmitting circuit. In step S502, an analog input signal is received, and convert the analog input signal is converted into a digital input signal for outputting by using a receiving circuit. In step S503, digital echo cancellation is performed according to the digital output signal and the digital input signal to generate an echo energy indicator. Then, a first variable capacitor, a second variable capacitor, a third variable capacitor and a fourth variable capacitor are adjusted according to a first capacitance calibration signal and a second capacitance calibration signal, so as to determine a first optimal value of the first capacitance calibration signal and a second optimal value of the second capacitance calibration signal according to the echo energy indicator. Further, in step S504, it is determined whether an energy statistical value of the echo energy indicator is the minimum. If a determination result of the step S504 indicates that the energy statistical value of the echo energy indicator is not the minimum, in step S506, the first variable capacitor, the second variable capacitor, the third variable capacitor and the fourth variable capacitor are continually adjusted according to the first capacitance calibration signal and the second capacitance calibration signal. The step S504 and the step S506 are repeatedly executed until it is detected that the energy statistical value of the echo energy indicator is the minimum. Then, if the determination result of the step S504 indicates that the energy statistical value of the echo energy indicator is the minimum, in step S505, the first capacitance calibration signal and the second capacitance calibration signal are locked and output according to the first optimal value and the second optimal value.

Figure 6:
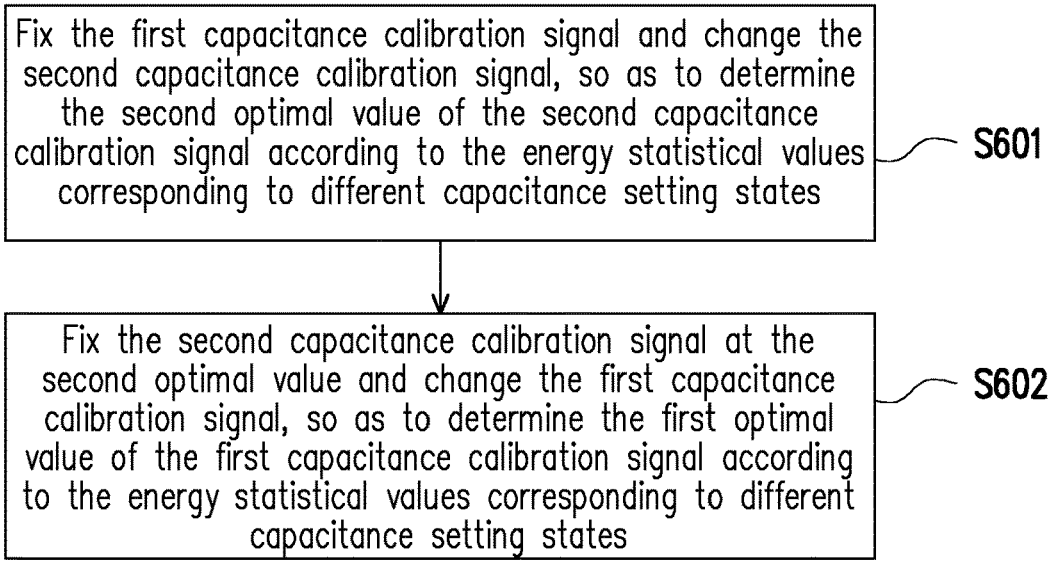
FIG. 6 is a flowchart illustrating a method of determining optimal capacitances according to an embodiment of the invention.

FIG. 6 is a flowchart illustrating a method of determining optimal capacitances according to an embodiment of the invention. Those skilled in the art may learn enough instructions and recommendations for related implementation details of the method of determining the optimal capacitances and related device features of the present embodiment from descriptions of the embodiments of FIG. 1 to FIG. 4, and details thereof are not repeated. Referring to FIG. 6, in step S601, the first capacitance calibration signal is fixed and the second capacitance calibration signal is changed, so as to determine the second optimal value of the second capacitance calibration signal according to the energy statistical values corresponding to different capacitance setting states. In step S602, the second capacitance calibration signal is fixed to the second optimal value and the first capacitance calibration signal is changed, so as to deternfine the first optimal value of the first capacitance calibration signal according to the energy statistical values corresponding to different capacitance setting states.

Figure 7:
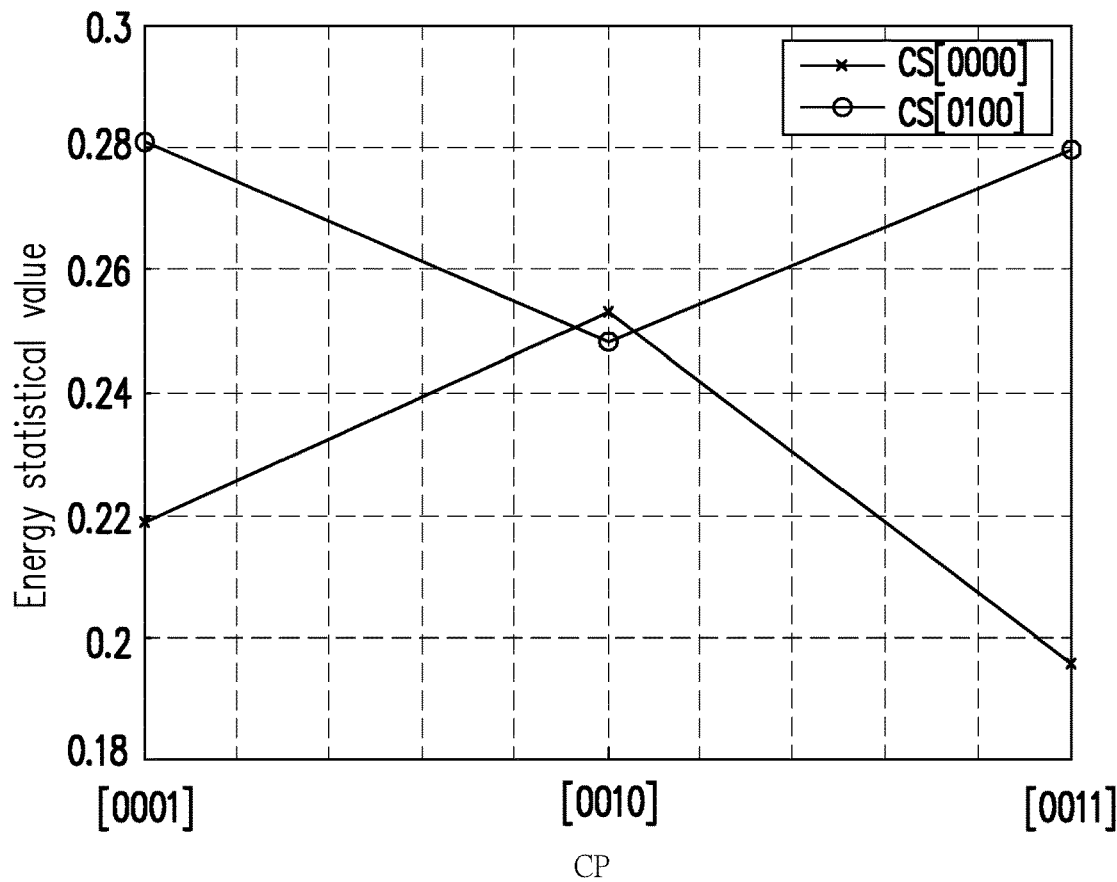
FIG. 7 is an example of energy statistical values under different capacitance setting states according to an embodiment of the invention.

For example, FIG. 7 is an example of energy statistical values under different capacitance setting states according to an embodiment of the invention. In FIG. 7, six different capacitance setting states are taken as an example for description, though the invention is not limited thereto. Referring to FIG. 7, when the first capacitance calibration signal CP is set to [0001] and the second capacitance calibration signal CS is set to [0000], the energy statistical value is about 0.22. When the first capacitance calibration signal CP is set to [0001] and the second capacitance calibration signal CS is set to [0010], the energy statistical value is about 0.28. When the first capacitance calibration signal CP is set to [0010] and the second capacitance calibration signal CS is set to [0000], the energy statistical value is about 0.255. When the first capacitance calibration signal CP is set to [0010] and the second capacitance calibration signal CS is set to [0100], the energy statistical value is about 0.25. When the first capacitance calibration signal CP is set to [0011] and the second capacitance calibration signal CS is set to [0000], the energy statistical value is about 0.197. When the first capacitance calibration signal CP is set to [0011] and the second capacitance calibration signal CS is set to [0100], the energy statistical value is about 0.28.

Namely, in all of the capacitance setting states shown in FIG. 7, when the first capacitance calibration signal CP is set to [0011] and the second capacitance calibration signal CS is set to [0000], the energy statistical value is the minimum.

Therefore, in the six capacitance setting states shown in FIG. 7, when the first capacitance calibration signal CP is set to [0011] and the second capacitance calibration signal CS is set to [0000], the echo interference may be effectively eliminated.

In summary, in an embodiment of the invention, according to the capacitances of the variable capacitors disposed in front-end of the hybrid transceiving circuit and by using the digital echo canceller to estimate the energy of the echo signal, the hybrid fine-tune circuit may determine a set of optimal capacitances according to energy magnitude of the echo signal, and the optimal capacitances may achieve the better performance of impedance matching so as to obviously reduce the influence of the echo interference. Moreover, by comparing and updating the temporary minimum energy value in the register in real-time, the optimal capacitance setting state may be effectively determined, so as to effectively avoid a phenomenon of package lost caused by excessive parameter calibration time for echo cancellation. Moreover, in the embodiments of the invention, since the optimal capacitance setting state is determined in an efficient way, the variable capacitors with higher precision (variable capacitors with more control bit number) may be applied to improve the performance of echo interference cancellation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A communication device, adapted to implement full-duplex data transmission, and comprising:
   a transmitting circuit, receiving a digital output signal to generate an analog output signal;
   a receiving circuit, receiving an analog input signal to generate a digital input signal;
   a digital echo canceller, coupled to the transmitting circuit and the receiving circuit, and generating an echo energy indicator according to the digital output signal and the digital input signal;
   a transceiving front-end circuit, coupled to the transmitting circuit, and receiving the analog output signal and generating a hybrid interface signal;
   a hybrid fine-tune circuit, coupled to the digital echo canceller, and generating a first capacitance calibration signal and a second capacitance calibration signal according to the echo energy indicator; and
   an analog echo cancellation circuit, receiving the first capacitance calibration signal and the second capacitance calibration signal, and comprising a first variable capacitor and a second variable capacitor controlled by the first capacitance calibration signal and a third variable capacitor and a fourth variable capacitor controlled by the second capacitance calibration signal, wherein the analog echo cancellation circuit receives the analog output signal and the hybrid interface signal, and generates the analog input signal according to the first capacitance calibration signal and the second capacitance calibration signal.

2. The communication device as claimed in claim 1, wherein a first terminal of the first variable capacitor receives a reference voltage, a second terminal of the first variable capacitor is coupled to a first input terminal of the receiving circuit, a first terminal of the third variable capacitor is coupled to the second terminal of the first variable capacitor, and a second terminal of the third variable capacitor is coupled to a first output terminal of the transmitting circuit.

3. The communication device as claimed in claim 1, wherein a first terminal of the third variable capacitor receives a reference voltage, a second terminal of the second variable capacitor is coupled to a second input terminal of the receiving circuit, a first terminal of the fourth variable capacitor is coupled to the second terminal of the second variable capacitor, and a second terminal of the fourth variable capacitor is coupled to a second output terminal of the transmitting circuit.

4. The communication device as claimed in claim 1, wherein the hybrid fine-tune circuit comprises:
   an energy calculation circuit, coupled to the digital echo canceller to obtain an energy statistical value of the echo energy indicator; and
   a search and capacitance setting circuit, coupled to the energy calculation circuit, generating the first capacitance calibration signal and the second capacitance calibration signal, and determining a first optimal value of the first capacitance calibration signal and a second optimal value of the second capacitance calibration signal according to the energy statistical value.

5. The communication device as claimed in claim 4, wherein the search and capacitance setting circuit obtains a plurality of energy statistical values corresponding to different capacitance setting states from the energy calculation circuit by adjusting the first capacitance calibration signal and the second capacitance calibration signal, wherein based on a minimum energy statistical value among the energy statistical values, the search and capacitance setting circuit obtains the first optimal value and the second optimal value corresponding to the minimum energy statistical value, and the hybrid fine-tune circuit locks and outputs the first capacitance calibration signal and the second capacitance calibration signal according to the first optimal value and the second optimal value.

6. The communication device as claimed in claim 5, wherein by fixing the first capacitance calibration signal and changing the second capacitance calibration signal, the search and capacitance setting circuit determines the second optimal value of the second capacitance calibration signal,
   wherein by fixing the second capacitance calibration signal to the second optimal value and changing the first capacitance calibration signal, the search and capacitance setting circuit determines the first optimal value of the first capacitance calibration signal.

7. The communication device as claimed in claim 1, wherein the transceiving front-end circuit comprises a first impedance unit and a second impedance unit, the first impedance unit is coupled between a first output terminal of the transmitting circuit and a second input terminal of the receiving circuit, and the second impedance unit is coupled between a second output terminal of the transmitting circuit and a first input terminal of the receiving circuit.

8. An echo cancellation method, adapted to a communication device capable of implementing full-duplex data transmission, wherein the communication device comprises a first variable capacitor, a second variable capacitor, a third variable capacitor and a fourth variable capacitor, the echo cancellation method comprising:
   converting a digital output signal into an analog output signal and output the analog output signal by a transmitting circuit;
   receiving an analog input signal, and convert the analog input signal into a digital input signal for outputting by a receiving circuit;
   performing digital echo cancellation according to the digital output signal and the digital input signal to generate an echo energy indicator;
   adjusting the first variable capacitor, the second variable capacitor, the third variable capacitor and the fourth variable capacitor according to a first capacitance calibration signal and a second capacitance calibration signal, so as to determine a first optimal value of the first capacitance calibration signal and a second optimal value of the second capacitance calibration signal according to the echo energy indicator; and
   locking and outputting the first capacitance calibration signal and the second capacitance calibration signal according to the first optimal value and the second optimal value.

9. The echo cancellation method as claimed in claim 8, wherein the step of adjusting the first variable capacitor, the second variable capacitor, the third variable capacitor and the fourth variable capacitor according to a first capacitance calibration signal and a second capacitance calibration signal, so as to determine the first optimal value of the first capacitance calibration signal and the second optimal value of the second capacitance calibration signal according to the echo energy indicator comprises:
   performing a statistical operation to the echo energy indicator to obtain an energy statistical value, so as to determine the first optimal value of the first capacitance calibration signal and the second optimal value of the second capacitance calibration signal according to the energy statistical value.

10. The echo cancellation method as claimed in claim 9, wherein the step of performing the statistical operation to the echo energy indicator to obtain the energy statistical value, so as to determine the first optimal value of the first capacitance calibration signal and the second optimal value of the second capacitance calibration signal according to the energy statistical value comprises:
   obtaining a plurality of energy statistical values corresponding to different capacitance setting states from the energy calculation circuit by adjusting the first capacitance calibration signal and the second capacitance calibration signal; and
   based on a minimum energy statistical value among the energy statistical values, obtaining the first optimal value and the second optimal value corresponding to the minimum energy statistical value.

11. The echo cancellation method as claimed in claim 10, wherein the second optimal value of the second capacitance calibration signal is determined by fixing the first capacitance calibration signal and changing the second capacitance calibration signal, and the first optimal value of the first capacitance calibration signal is determined by fixing the second capacitance calibration signal to the second optimal value and changing the first capacitance calibration signal.

* * * * *